UNITED STATES PATENT OFFICE.

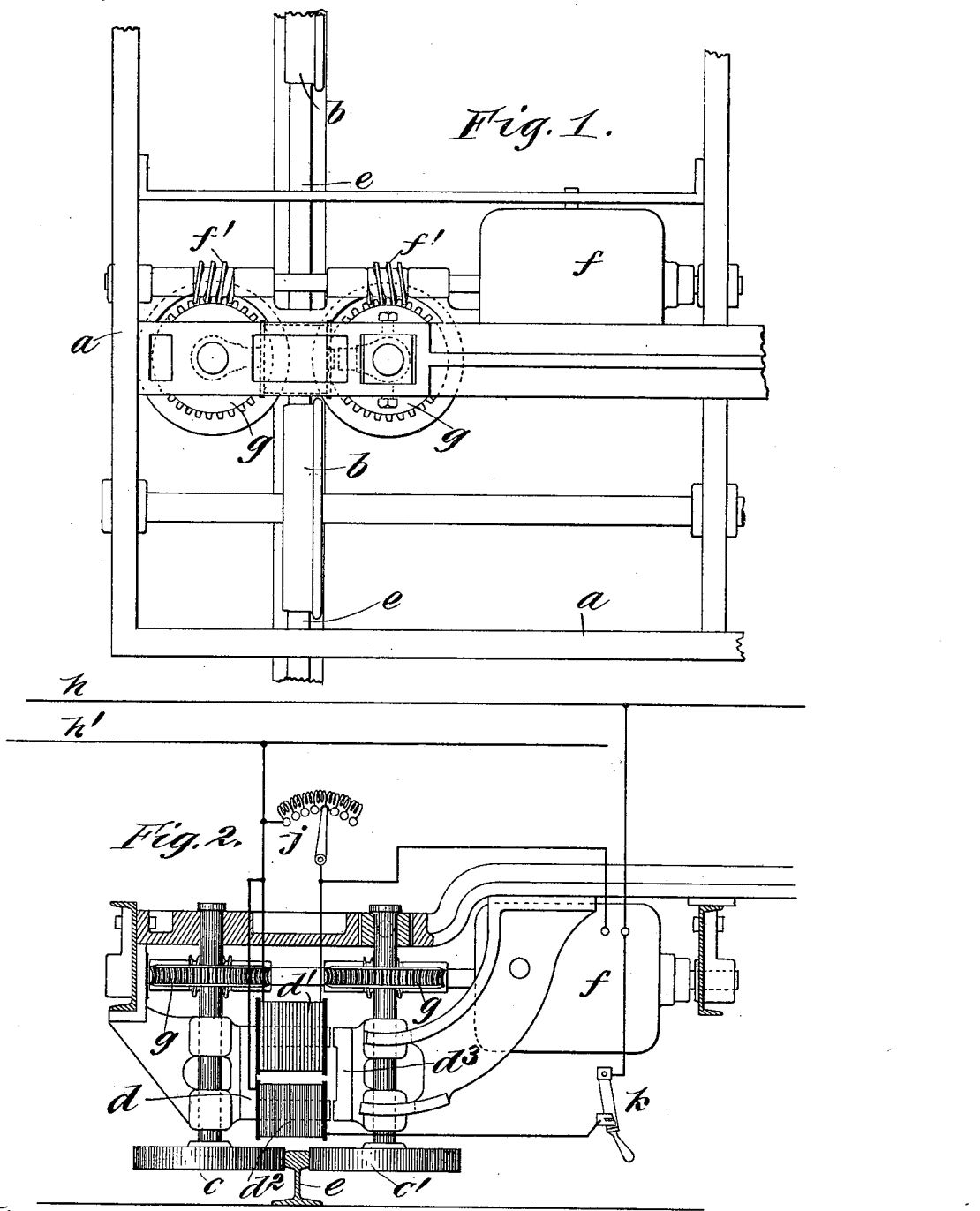

FRIEDRICH WILHELM ERNST ZANDER, OF CHARLOTTENBURG, GERMANY, ASSIGNOR TO THE SIEMENS & HALSKE ELECTRIC COMPANY OF AMERICA, OF CHICAGO, ILLINOIS.

ELECTRIC TRACTION-MOTOR.

SPECIFICATION forming part of Letters Patent No. 627,565, dated June 27, 1899.

Application filed February 17, 1899. Serial No. 705,857. (No model.)

*To all whom it may concern:*

Be it known that I, FRIEDRICH WILHELM ERNST ZANDER, a subject of the Emperor of Germany, residing at Charlottenburg, Germany, have invented a certain new and useful Improvement in Electric Traction-Motors, (Case No. 183,) of which the following is a full, clear, concise, and exact description.

My invention relates to improvements in electric traction-motors, and has for its object the provision of means for securing with a given motor a high tractive force while avoiding disadvantages obtaining with similar classes of apparatus.

More particularly my invention consists in providing electromagnetic means for securing a tractive moment corresponding with the varying needs of a given system.

In cases where the rotation of the supporting-wheels of a motor are insufficient for securing the necessary tractive force it becomes essential to insure an increase thereof, which may be obtained by employing laterally-acting rollers which are adapted to bear upon the sides of the rail-head, the said rollers being forced against the rail by means of springs of any desired strength or other mechanical means. These rollers are connected with and are adapted to be driven by a suitable connection with an electric motor or motors. This arrangement, however, has the disadvantage of securing an unvarying pressure upon the rail during the operation of the motor-vehicle, which not only results in unusual wear of the parts concerned, but increases the amount of current required by the motors. It is apparent that with varying loads or upon differing gradients the tractive force required will vary considerably, and inasmuch as economical considerations make it desirable that such tractive force should be no more than sufficient for the work in hand a close regulation thereof corresponding to the varying conditions of load insures decided advantages of operation.

By employing the arrangement of my present invention I have been enabled to overcome the objections inherent in the apparatus above considered and have secured in addition advantages which are not obtainable by employing the said construction.

I may describe the improvement of my invention briefly by stating that the same consists in providing an electromagnet which is adapted to force the laterally-acting traction-rollers of a motor-vehicle into engagement with the rail-head with any desired force, the said electromagnet being provided with a winding connected in series with the propelling-motor and a small auxiliary winding which is connected in parallel with said motor.

My said invention will be more readily understood by reference to the accompanying drawings, wherein—

Figure 1 illustrates an electrically-operated motor-vehicle equipped in accordance with my invention; and Fig. 2 shows, in somewhat diagrammatic manner, the traction mechanism and improvements of my invention employed upon the said vehicle.

The same letter of reference is used to designate like parts in both figures of the drawings.

The motor-car $a$ is provided with supporting-wheels $b\ b$, which are adapted to travel upon the rails $e$ of the track. The said wheels may, if desired, be provided with independent motors, or they may be connected with additional motors provided upon the car for the purpose of driving the traction-rollers.

The improvements of my invention, which are somewhat diagrammatically indicated in Fig. 2, consist in applying to the shafts of the traction-rollers $c\ c'$ an electromagnetic device $d$, which is adapted to secure the engagement of said traction-rollers with the sides of the rail-head $e$ and furnish all or a part of the tractive moment of the vehicle. The traction-rollers $c\ c'$ are mounted at the lower ends of vertically-journaled shafts carried by the frame of the car, the upper journal of roller $c'$ being pivotally mounted near the upper end of the shaft, whereby sufficient lateral movement of the shaft and roller is secured to enable the traction-rollers to grip and release the rail-head. Obviously both of the shafts and rollers could be mounted to swing toward and from the rail, if so desired. The motor $f$ is provided with tangent-screws $f'\,f'$, which are adapted to engage the worm-wheels $g\,g$, mounted upon the shafts of the traction-rollers, the said tangent-screws and worm-wheels for the respective shafts being reversely cut to secure the rotation of the traction-rollers in opposite directions, as indicated by the arrows. Current is supplied to the motor $f$ by the mains $h\,h'$, which are also connected with the electromagnetic device $d$. This device consists of an electromagnet, which is journaled upon one of the shafts of the traction-rollers, while the coacting armature of said magnet is journaled upon the shaft of the other traction-roller. The device is provided with a winding of coarse wire $d'$, which is connected in series with the motor, the attraction of the said magnet under normal conditions and at starting varying approximately in accordance with the tractive power exerted by the motor. A second winding $d^2$ of much smaller size and relatively high resistance is connected in shunt with the motor and winding $d'$. A regulating-rheostat $j$ is connected in parallel with the main winding $d'$ of device $d$, whereby the attractive force of said winding may be readily controlled, while the switch $k$, connected in circuit with the auxiliary winding $d^2$, serves to cut the same into and out of circuit, as required.

The operation of the device $d$ will at once be apparent, since it will be seen that when the motor is propelling a heavy load through the medium of the traction-rollers $c\,c'$ the winding $d'$ will be correspondingly energized by the current flowing through said motor-circuit and will thereby secure the attraction of the armature $d^3$ with corresponding force, which results in forcing the traction-rollers $c\,c'$ into engagement with the rail $e$. As the load upon the motor increases or decreases the attractive force of the winding $d'$ and the pressure of the traction-rollers $c\,c'$ upon the rail will increase or decrease approximately in direct proportion, thereby suiting the same to the varying conditions of work. For the purpose of securing an adequate pressure of the traction-rollers, however, during the operation of the motor under light load I have provided the winding $d^2$ upon the electromagnetic device $d$, which serves at all times when shunted into circuit to attract the armature $d^3$ and secure a minimum pressure of the traction-rollers upon the rail $e$.

It will be understood that the attraction of the electromagnet may be varied in the well-known manner by altering the resistance connected in shunt therewith in rheostat $j$, while the main winding $d'$ may be augmented as desired by switching the auxiliary winding $d^2$ into circuit. Commonly, however, with the electromagnet properly proportioned to suit the class of work in hand it will be found that the main winding will furnish the necessary pressure of the traction-rollers under normal conditions of operation.

It is obvious that various modifications in the apparatus herein shown and described may be made without departing from the spirit of my invention, and I do not desire to be understood as limiting the same to the precise embodiment diagrammatically set forth in illustration thereof.

I therefore claim, and desire to secure by these Letters Patent, the following:

1. In an electromagnetic device for controlling the pressure of traction wheels or rollers, the combination with a main winding $d'$ connected in series with the energizing-circuit and an auxiliary winding $d^2$ connected in shunt therewith, an armature $d^3$ associated with said windings and adapted to be attracted thereby, and means for imparting the force of the electromagnet to suitable traction-rollers, substantially as described.

2. In an electromagnetic device for controlling the pressure of traction wheels or rollers, the combination with an electromagnet $d$ having a main winding $d'$ connected in series with the propelling-motor and an auxiliary winding $d^2$ connected in shunt therewith, and means for imparting to the traction-rollers the force exerted by said electromagnet, substantially as described.

3. The combination with an electric motor $f$, of traction-rollers mechanically connected with and adapted to be driven thereby and a pressure-controlling device $d$ associated with the said traction-rollers, the said device having a winding $d'$ connected in series with the motor $f$, and an auxiliary winding $d^2$ connected in shunt relation with said motor, substantially as and for the purpose specified.

4. The combination with an electric motor $f$, of pressure-rollers $c\,c'$ mechanically connected therewith and adapted to be driven thereby, an electromagnetic device $d$ having an armature $d^3$ associated with one of the traction-rollers and an electromagnet associated with the other, a main winding $d'$ provided upon said electromagnet connected in series with the motor, and an auxiliary winding $d^2$ connected in shunt relation with the motor, substantially as and for the purpose described.

5. The combination with laterally-acting traction-rollers $c\,c'$, of an electric motor connected with and adapted to rotate the same, an electromagnet associated with one of said rollers, and a coacting armature associated with the other of said rollers, the said electromagnet having a winding $d'$ connected in series with the motor, whereby the pressure of the traction-rollers is varied in accordance with the operative conditions of the motor, substantially as described.

6. The combination with laterally-acting traction-rollers $c\ c'$, of an electric motor connected with and adapted to rotate the same, an electromagnet associated with one of said rollers and a coacting armature associated with the other of said rollers, the said electromagnet having a main winding $d'$ connected in series with the motor, and a secondary winding $d^2$ connected in shunt relation with the motor, whereby the pressure of the traction-rollers is varied in accordance with the operative conditions of the motor, substantially as described.

In witness whereof I hereunto subscribe my name this 17th day of January, A. D. 1899.

FRIEDRICH WILHELM ERNST ZANDER.

Witnesses:
PAUL ROEDIGER,
ERURIE L. GOLDSCHMIDT.